UNITED STATES PATENT OFFICE.

HARRY M. WEBER, OF BLOOMFIELD, NEW JERSEY, ASSIGNOR TO ELLIS-FOSTER COMPANY, A CORPORATION OF NEW JERSEY.

CHEWING-GUM AND PROCESS OF MAKING SAME.

1,401,452.  Specification of Letters Patent.  Patented Dec. 27, 1921.

No Drawing.  Application filed June 4, 1919. Serial No. 301,788.

*To all whom it may concern:*

Be it known that I, HARRY M. WEBER, a citizen of the United States, residing at Bloomfield, in the county of Essex and State of New Jersey, have invented certain new and useful Improvements in Chewing-Gum and Processes of Making Same, of which the following is a specification.

This invention relates to chewing gum compositions and to the plastic raw materials employed in making same and also to the process of producing such plastic materials or compositions, all as will be more fully hereinafter described and as claimed.

The invention is especially concerned with the use of resinous bodies of the type of ordinary rosin or colophony which heretofore has not been employed advantageously in chewing gum compositions for several reasons, one of which is the strong resinous flavor which it imparts and another is the danger, through the presence of turpentine bodies, of oxidizing the rubber or chicle material which is customarily present in such compositions and thus producing a product which is brittle and unfit for mastication.

These difficulties attendant upon the use of rosin may be overcome in large measure or entirely by esterifying the rosin with a suitable esterifying agent such as glycerin or glycol. When rosin is heated with glycerin at a temperature of 280° and upward an ester is obtained which has a reduced acid number. By protracted esterification products may be obtained with acid numbers of 25 or lower and in some cases of 3 to 5. These products of low acid number are eminently suited for use in chewing gum compositions containing chicle, gutta percha, pontianak rubber and the like. As a result of esterification and the distillation which accompanies this operation turpentine-like bodies are largely expelled and the union of the resin acid with the glycerin substantially eliminates the resinous taste. The flavor may be further improved by treatment with steam as for example by blowing dry steam into the rosin ester maintained at a temperature of about 150° C. for a period of one hour. Esterification below an acid number of 5 is ordinarily difficult and the final traces of acidity may be neutralized by treatment with quick lime, carbonate of lime, magnesium carbonate and the like at a temperature of 150° or higher to produce the lime or magnesium compounds with the free resin acids. For a rosin ester of an acid number ranging from 5 to 25 only a small amount of neutralizing agent is required. For example one per cent. of magnesium carbonate suffices to neutralize such esters to the extent desired. The steam treatment may be carried out prior to the addition of the alkaline earth or subsequent thereto. Both the steaming and alkaline earth treatment may be omitted in some cases or either one used to the exclusion of the other according to the character of the resin which is being treated. I do not limit myself strictly to the use of rosin but may esterify other resins in like manner and use them as indicated in the case of rosin ester. For example Kongo gum may be esterified by adding about half its weight of rosin oil and heating to 300° C. for several hours. Ten per cent. of gylcerin is then added, esterification taking place very rapidly and the acid number falling to around say 8 or 10. The product of this character, which also if desired may be steamed and limed, may be employed either in conjunction with the rosin ester or by itself. Such esterified product may be incorporated as stated, with various rubbers, gutta percha, chicle and the like to form plastic masses which have good masticating properties and have no resin taste. This masticating basis may be further incorporated with sugar and flavoring material to produce a chewing gum. A certain amount of water is desirably present in the finished composition in order to secure the proper initial masticating effect.

Various other additions may be made to such compositions such as paraffin wax, spruce gum, pontianak resin, cumaron resin and the like. In using cumaron resin it may be employed in the manner set forth in my Patent No. 1,248,961. Mixtures containing about equal parts of cumaron resin and rosin ester form a satisfactory resin basis for incorporation with the rubber or gutta percha components.

A desirable rubber basis may be obtained from pontianak gum by heating the commercial grade of the gum containing its natural associated resin, a temperature of about 200° C. being maintained for several hours during which time certain changes take place in the structure of the components of the gum and a plastic, masticable product is obtained which incorporates remarkably well with rosin esters and the like to yield a suitable chewing gum basis.

The invention not only embraces rosin or resin esters as such, but also includes mixtures of these with suitable resin compounds such as the abietates of lime and magnesium. In some cases also the lime or magnesium compounds of rosin without the presence of glycerids or other esters may be steamed to remove oil of turpentine or rosin oil or other bodies having a pronounced flavor and this product may be employed in the chewing gum basis.

As examples of the foregoing specifications I cite the following. I do not however, limit myself to the quantities or materials given:

25 lbs. chicle,
10 lbs. rosin ester, (acid No. 25.)

20 lbs. rosin ester,
20 lbs. gutta jankar gum,
5 lbs. chicle.

10 lbs. pontianak rubber,
10 lbs. gutta jankar,
10 lbs. rosin ester.

20 lbs. rosin ester, (steam distilled,)
20 lbs. gutta siak,
40 lbs. sugar, (in solution.)
30 lbs. sugar,
20 lbs. chicle,
10 lbs. rosin ester, (with 1% magnesium carbonate.)

Sufficient water and oil of wintergreen to work material properly.

15 lbs. rosin ester.
10 lbs. pontianak rubber,
4 lbs. gutta jankar,
2 lbs. paraffin,
4 lbs. $H_2O$.

In order to embrace under one term bodies such as chicle, balata, gutta percha and various rubbers I employ in the following claims the term rubber to embrace and signify plastic bodies of this character.

What I claim is:—

1. A chewing gum composition containing a rosin ester.
2. A chewing gum composition containing a deodorized rosin ester.
3. A chewing gum composition comprising rosin ester associated with rubber-like material, sugar and flavoring agents.
4. A chewing gum composition comprising a resin ester and rubber like material.
5. A chewing gum composition comprising a synthetic resin ester.
6. A chewing gum composition comprising rosin ester and chicle.
7. A chewing gum composition comprising chicle and rosin ester free from resinous flavor.

HARRY M. WEBER.